(12) United States Patent
Anzawa

(10) Patent No.: US 8,868,320 B2
(45) Date of Patent: Oct. 21, 2014

(54) CONTROL DEVICE FOR INTERNAL COMBUSTION ENGINE, VEHICLE, AND CONTROL METHOD FOR INTERNAL COMBUSTION ENGINE

(75) Inventor: Takumi Anzawa, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 361 days.

(21) Appl. No.: 13/433,579

(22) Filed: Mar. 29, 2012

(65) Prior Publication Data

US 2012/0253633 A1 Oct. 4, 2012

(30) Foreign Application Priority Data

Mar. 31, 2011 (JP) ................. 2011-078884

(51) Int. Cl.
| | |
|---|---|
| F02N 11/08 | (2006.01) |
| F02D 41/08 | (2006.01) |
| F02D 29/02 | (2006.01) |
| B60K 6/445 | (2007.10) |
| F02D 17/04 | (2006.01) |
| B60W 20/00 | (2006.01) |
| B60W 30/20 | (2006.01) |
| F02D 41/06 | (2006.01) |
| B60W 10/06 | (2006.01) |

(52) U.S. Cl.
CPC ............... *F02D 17/04* (2013.01); *F02D 29/02* (2013.01); *Y02T 10/6239* (2013.01); *B60W 20/00* (2013.01); *F02N 2200/023* (2013.01); *B60W 2030/206* (2013.01); *B60K 6/445* (2013.01); *F02D 41/08* (2013.01); *F02D 41/064* (2013.01); *B60W 10/06* (2013.01); *B60W 2710/065* (2013.01); *Y02T 10/48* (2013.01); *F02N 11/0818* (2013.01)
USPC ..... 701/110; 701/112; 123/179.4; 123/339.14

(58) Field of Classification Search
USPC ............... 701/102, 110, 112, 113; 123/179.3, 123/179.4, 179.28, 339.1, 339.14, 339.22, 123/339.24
See application file for complete search history.

(56) References Cited

U.S. PATENT DOCUMENTS

| | | | |
|---|---|---|---|
| 6,460,500 | B1 | 10/2002 | Ooyama et al. |
| 7,110,877 | B2 * | 9/2006 | Ozeki et al. ............... 701/112 |
| 2004/0181353 | A1 | 9/2004 | Doelker |
| 2005/0225175 | A1 | 10/2005 | Maehara et al. |
| 2006/0030997 | A1 | 2/2006 | Ozeki et al. |
| 2006/0048734 | A1 | 3/2006 | Kataoka et al. |
| 2012/0136553 | A1 * | 5/2012 | Takeuchi et al. ............. 701/102 |

FOREIGN PATENT DOCUMENTS

| | | | |
|---|---|---|---|
| JP | 2001082202 A | 3/2001 | |
| JP | 2004263566 A | 9/2004 | |
| JP | 2004535525 A | 11/2004 | |
| JP | 2005023838 A | 1/2005 | |
| JP | 2005325832 A | 11/2005 | |

(Continued)

*Primary Examiner* — Hai Huynh
(74) *Attorney, Agent, or Firm* — Gifford, Krass, Sprinkle, Anderson & Citkowski, P.C.

(57) ABSTRACT

Control over an internal combustion engine that automatically stops includes: setting a first idle rotation speed, which is used after a lapse of a short stop period of the internal combustion engine, and a second idle rotation speed, which is used after a lapse of a long stop period of the internal combustion engine, at different values; and, when an idle rotation speed of the internal combustion engine is the second idle rotation speed, restricting automatic stop of the internal combustion engine.

13 Claims, 6 Drawing Sheets

(56) References Cited

FOREIGN PATENT DOCUMENTS

| | | | |
|---|---|---|---|
| JP | 2006046214 A | 2/2006 |
| JP | 2006152877 A | 6/2006 |
| JP | 2006177173 A | 7/2006 |
| JP | 2009228538 A | 10/2009 |

* cited by examiner

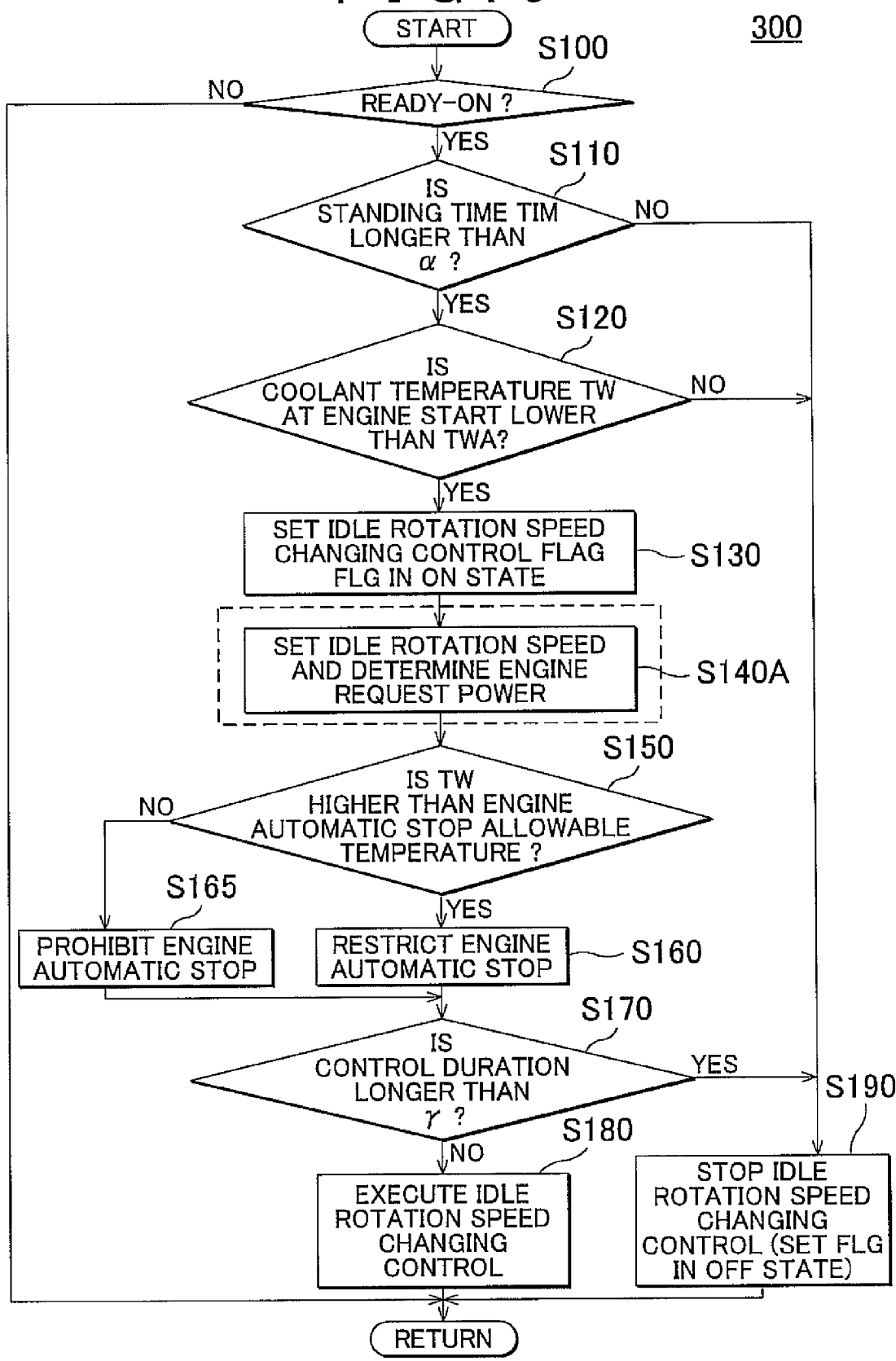

CONTROL DEVICE FOR INTERNAL COMBUSTION ENGINE, VEHICLE, AND CONTROL METHOD FOR INTERNAL COMBUSTION ENGINE

CROSS REFERENCE TO RELATED APPLICATIONS

This application claims priority to Japanese Patent Application No. 2011-078884 filed on Mar. 31, 2011, which is incorporated herein by reference in its entirety including the specification, drawings and abstract.

BACKGROUND OF THE INVENTION

1. Field of the Invention

The invention relates to a control device for an internal combustion engine, a vehicle and a control method for an internal combustion engine and, more particularly, to control for setting the idle rotation speed of an internal combustion engine.

2. Description of Related Art

In an internal combustion engine, such as an engine, the rotation speed of the engine in so-called idle operation in which the engine is autonomously operated in a state where driving force is not transmitted to a load after the start of the engine (hereinafter, also referred to as "idle rotation speed") is desirably set so as to be as low as possible within the range in which autonomous operation is possible in order to reduce fuel consumption.

On the other hand, while the engine is being operated, vibrations occur because of the operation of the engine; however, in order to reduce vibrations during idle operation, the idle rotation speed is set so as to be higher than a rotation speed at which resonance is caused to occur in a driving force transmission system including the engine (hereinafter, also referred to as "resonance rotation speed").

Japanese Patent Application Publication No. 2006-152877 (JP 2006-152877 A) describes a configuration that, in a hybrid vehicle that cranks a mounted engine with a motor to start the engine, when an increase in the rotation speed of the engine is suppressed at the time of cranking the engine and, therefore, the rotation speed of the engine at the time of cranking may coincide with the resonance rotation speed of the driving force transmission system, the motor is driven such that the rotation speed of the engine is lower than the resonance rotation speed.

With the configuration described in JP 2006-152877 A, at the time of cranking the engine to start the engine, even when the rotation speed of the engine may coincide with the resonance rotation speed because of an increase in friction torque, a decrease in motor output due to a decrease in battery output, or the like, it is possible to suppress the resonance of the driving force transmission system.

Generally, in order to reduce vibrations during idle operation, the idle rotation speed of the engine is set to a value different from a rotation speed corresponding to the resonance frequency of the driving force transmission system to which vibrations are transmitted from the engine (resonance rotation speed).

However, for example, when the vehicle has been continuously maintained in a state where the engine is stopped for a long period of time in a low-temperature environment (for example, −15° C. or below) in a cold place, or the like, the resonance rotation speed of the driving force transmission system may vary. Therefore, when the vehicle has been continuously maintained in a state where the engine is stopped in a low-temperature environment, vibrations during idle rotation may increase because the resonance rotation speed of the driving force transmission system approaches the idle rotation speed.

On the other hand, in recent years, for the purpose of improvement in fuel economy, there are vehicles that have an idle stop function or an economy running function that automatically stops the engine when the vehicle is stopped to wait at a traffic light, for example. In addition, in hybrid vehicles on which an engine and an electric motor are mounted, some of the hybrid vehicles are able to carry out an electric vehicle (EV) running mode in which only driving force from the electric motor is used to run while the engine is stopped, and, in such hybrid vehicles as well, the engine may be automatically stopped during the travel of the vehicle.

In this way, in a vehicle that has the function of automatically stopping the engine during the travel of the vehicle, in the case where the vehicle is left standing for a long period of time in a low-temperature environment as described above, when the engine is frequently stopped, energy, such as heat and vibrations, from the engine is not transmitted to the driving force transmission system, and such vibrations that occur at the time of the engine start may continuously occur for a long period of time.

SUMMARY OF THE INVENTION

The invention provides a control device for an internal combustion engine that automatically stops, a vehicle and a control method for an internal combustion engine that automatically stops, which suppress an increase in vibrations during idle operation when the state where the engine is stopped in a low-temperature environment has been continuously maintained.

A first aspect of the invention relates to a control device for an internal combustion engine that automatically stops. The control device includes: an idle speed setting unit that sets a first idle rotation speed, which is used after a lapse of a short stop period of the internal combustion engine, and a second idle rotation speed, which is used after a lapse of a long stop period of the internal combustion engine, at different values; and an internal combustion engine control unit that, when an idle rotation speed of the internal combustion engine is the second idle rotation speed, restricts automatic stop of the internal combustion engine.

The idle speed setting unit may be configured to set the idle rotation speed at the first idle rotation speed when a stop period of the internal combustion engine is shorter than or equal to a predetermined reference value, and may be configured to set the idle rotation speed at the second idle rotation speed when the stop period is longer than the reference value. The idle speed setting unit may be configured to set the second idle rotation speed so as to be higher than the first idle rotation speed. The idle speed setting unit may be configured to set the second idle rotation speed so as to be higher than a maximum value of a resonance rotation speed corresponding to a resonance frequency of a driving force transmission system that includes the internal combustion engine.

When the idle rotation speed is the second idle rotation speed, the internal combustion engine control unit may be configured to prohibit automatic stop of the internal combustion engine.

A condition for carrying out automatic stop of the internal combustion engine may include a situation that a temperature of coolant of the internal combustion engine is higher than a predetermined threshold, and, even when the temperature of coolant of the internal combustion engine is higher than the predetermined threshold, the internal combustion engine control unit may be configured to restrict automatic stop of the internal combustion engine when the idle rotation speed is the second idle rotation speed.

When a value relevant to an ambient temperature at the time of starting the internal combustion engine is lower than a threshold and the stop period is longer than the reference value, the idle speed setting unit may be configured to set the idle rotation speed at the second idle rotation speed.

The internal combustion engine may be mounted on a vehicle using a fixing member, and the fixing member may be configured such that a resonance frequency of the driving force transmission system that includes the internal combustion engine increases as a temperature of the fixing member decreases.

The internal combustion engine may be configured to be used together with a driving electric motor, and the internal combustion engine control unit may be configured to control the internal combustion engine and the driving electric motor such that required driving force is generated from the internal combustion engine and the driving electric motor, and may be configured to, when the idle rotation speed is set at the second idle rotation speed, set an output of the internal combustion engine at an output that is different from an output of the internal combustion engine when the idle rotation speed is set at the first idle rotation speed. The internal combustion engine control unit may be configured to control the internal combustion engine and the driving electric motor such that the required driving force is generated from the internal combustion engine and the driving electric motor, and may be configured to, when the idle rotation speed is set at the second idle rotation speed, set the output of the internal combustion engine at an output that is different from the output of the internal combustion engine when the idle rotation speed is set at the first idle rotation speed and at which efficiency of the internal combustion engine is optimal.

A second aspect of the invention relates to a vehicle. The vehicle includes: an internal combustion engine that automatically stops; and a control device that is used to control the internal combustion engine. The control device is configured to set a first idle rotation speed, which is used after a lapse of a short stop period of the internal combustion engine, and a second idle rotation speed, which is used after a lapse of a long stop period of the internal combustion engine, at different values, and is configured to, when an idle rotation speed of the internal combustion engine is the second idle rotation speed, restrict automatic stop of the internal combustion engine.

In the vehicle, the internal combustion engine may be mounted on the vehicle using a fixing member, and the fixing member may be configured such that a resonance frequency of the driving force transmission system that includes the internal combustion engine increases as a temperature of the fixing member decreases. A third aspect of the invention relates to a control method for an internal combustion engine that automatically stops. The control method includes: setting a first idle rotation speed, which is used after a lapse of a short stop period of the internal combustion engine, and a second idle rotation speed, which is used after a lapse of a long stop period of the internal combustion engine, at different values; and, when an idle rotation speed of the internal combustion engine is the second idle rotation speed, restricting automatic stop of the internal combustion engine.

According to the aspects of the invention, it is possible to suppress an increase in vibrations during idle operation when the state where the engine is stopped in a low-temperature environment has been continuously maintained.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a flow chart for illustrating the details of idle speed changing control process executed by the ECU in the second embodiment.

DETAILED DESCRIPTION OF EMBODIMENTS

Figure 1:
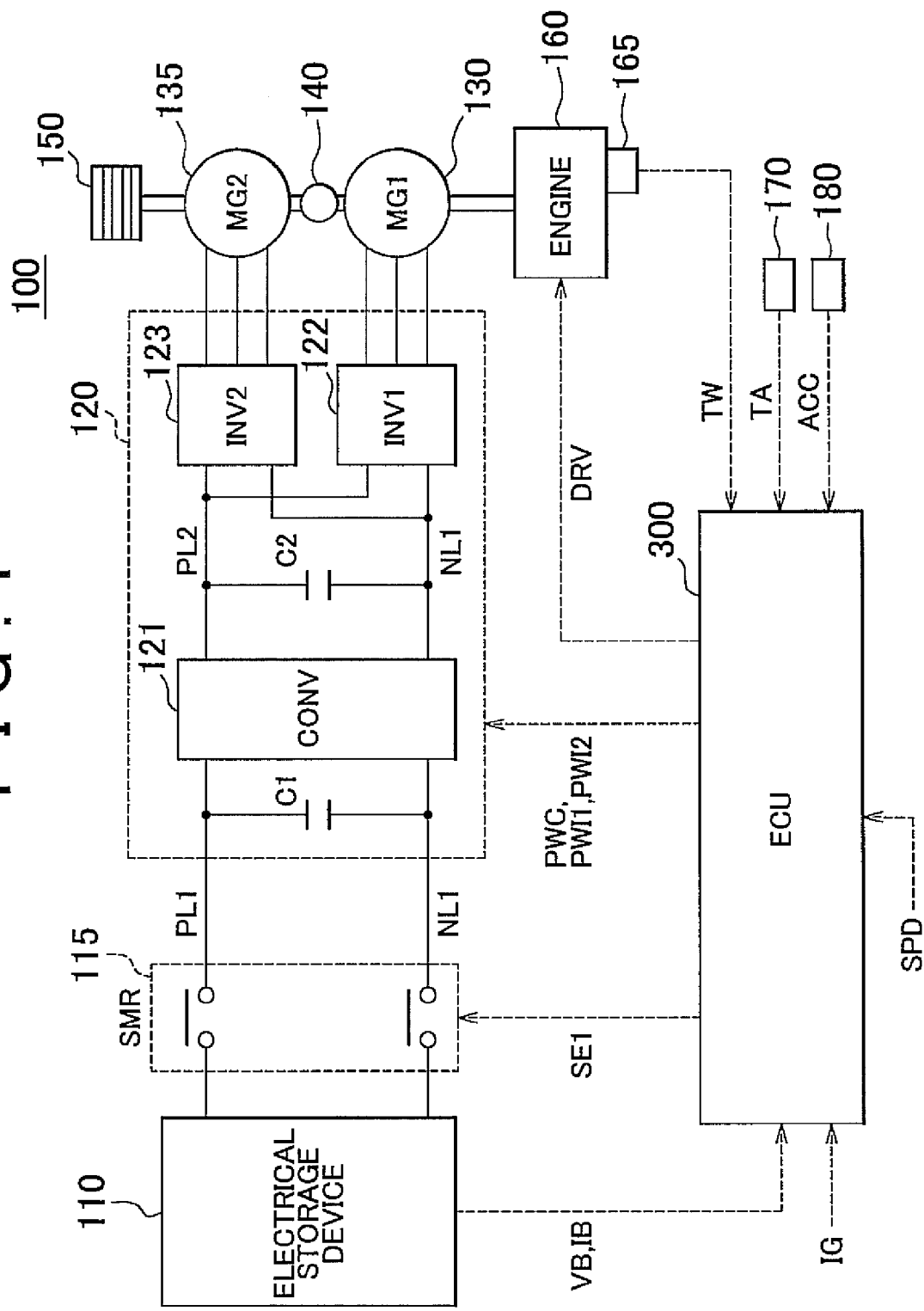
FIG. 1 is an overall block diagram of a vehicle according to an embodiment of the invention.

Hereinafter, an embodiment of the invention will be described in detail with reference to the accompanying drawings. Note that like reference numerals denote the same or corresponding components in the drawings, and the description thereof is not repeated.

Overall Configuration of Vehicle

FIG. 1 is an overall block diagram of a vehicle 100 according to the present embodiment. As shown in FIG. 1, the vehicle 100 includes an electrical storage device 110, a system main relay (SMR) 115, a power control unit (PCU) 120 that serves as a driving unit, motor generators 130 and 135, a power transmission gear 140, a drive wheel 150, an engine 160 that serves as an internal combustion engine, and an electronic control unit (ECU) 300 that serves as a control device. In addition, the PCU 120 includes a converter 121, inverters 122 and 123 and capacitors C1 and C2.

The electrical storage device 110 is an electric power storage element that is configured to be chargeable and dischargeable. The electrical storage device 110 is, for example, formed of a secondary battery, such as a lithium ion battery, a nickel metal hydride battery and a lead-acid battery, or an electrical storage element, such as an electric double layer capacitor.

The electrical storage device 110 is connected to the PCU 120 via a power line PL1 and a ground line NL1. Then, the electrical storage device 110 supplies the PCU 120 with electric power for generating the driving force of the vehicle 100. In addition, the electrical storage device 110 stores electric power generated by the motor generators 130 and 135. The output of the electrical storage device 110 is, for example, about 200 V.

Relays included in the SMR 115 are respectively connected in the power line PL1 and the ground line NL1 that connect the electrical storage device 110 to the PCU 120. Then, the SMR 115 switches between supply and interruption of electric power between the electrical storage device 110 and the PCU 120 on the basis of a control signal SE1 from the ECU 300.

The converter 121 converts voltage between the power line PL1 and ground line NL1 and the power line PL2 and ground line NL1 on the basis of a control signal PWC from the ECU 300.

The inverters 122 and 123 are connected to the power line PL2 and the ground line NL1 in parallel with each other. The inverter 122 converts direct-current power supplied from the converter 121 to alternating-current power on the basis of a control signal PWI1 from the ECU 300, and drives the motor generator 130. The inverter 123 converts direct-current power supplied from the converter 121 to alternating-current power on the basis of a control signal PWI2 from the ECU 300, and drives the motor generator 135.

The capacitor C1 is provided between the power line PL1 and the ground line NL1, and reduces fluctuations in voltage between the power line PL1 and the ground line NL1. In addition, the capacitor C2 is provided between the power line PL2 and the ground line NL1, and reduces fluctuations in voltage between the power line PL2 and the ground line NL1.

Each of the motor generators 130 and 135 is an alternating-current rotating electrical machine, and is, for example, a permanent-magnet synchronous motor that includes a rotor in which a permanent magnet is embedded.

The output torque of each of the motor generators 130 and 135 is transmitted to the drive wheel 150 via the power transmission gear 140 formed of a reduction gear and a power split mechanism to drive the vehicle 100. Each of the motor generators 130 and 135 is able to generate electric power using the rotary force of the drive wheel 150 at the time of regenerative braking operation of the vehicle 100. Then, the generated electric power is converted by the PCU 120 to charging electric power for charging the electrical storage device 110.

In addition, the motor generators 130 and 135 are also coupled to the engine 160 via the power transmission gear 140. Then, the motor generators 130 and 135 and the engine 160 are cooperatively operated by the ECU 300 to generate required vehicle driving force. Furthermore, each of the motor generators 130 and 135 is able to generate electric power using the rotation of the engine 160, and is able to charge the electrical storage device 110 using the generated electric power. In the present embodiment, the motor generator 135 is exclusively used as an electric motor for driving the drive wheel 150, and the motor generator 130 is exclusively used as a generator that is driven by the engine 160.

The rotation speed, valve open/close timing, fuel flow rate, and the like, of the engine 160 are controlled by a control signal DRV from the ECU 300 to cause the engine 160 to generate driving force for driving the vehicle 100.

Note that FIG. 1 shows an example of the configuration of a hybrid vehicle that runs using at least one of driving force from the engine 160 and driving force from the motor generators 130 and 135; instead, the present embodiment is applicable as long as the configuration includes at least an engine. Therefore, it is applicable that a vehicle does not include a motor generator but includes only an engine. Alternatively, it is also applicable that, in the case of a hybrid vehicle, a single motor generator is provided or two or more motor generators are provided.

A temperature sensor 165 is provided for the engine 160 to detect the temperature of coolant of the engine 160. The temperature sensor 165 outputs a signal that indicates the detected coolant temperature TW to the ECU 300.

In addition, the vehicle 100 further includes a temperature sensor 170 for detecting an outside air temperature and a vibration sensor 180 for detecting the vibrations of a vehicle body. The temperature sensor 170 outputs a signal TA that indicates the detected outside air temperature to the ECU 300.

The vibration sensor 180 is, for example, an acceleration sensor, and outputs a signal that indicates the detected vibration acceleration ACC of the vehicle body to the ECU 300.

The ECU 300 includes a central processing unit (CPU), a storage unit and an input/output buffer, which are not shown in FIG. 1. The ECU 300 inputs signals from the sensors, and the like, outputs control signals to the devices, and controls the vehicle 100 and the devices. Note that control over the vehicle 100 and the devices are not only limited to processing by software but may also be processed by exclusive hardware (electronic circuit).

The ECU 300 computes the state of charge (SOC) of the electrical storage device 110 on the basis of the detected voltage VB from a voltage sensor (not shown) and the detected current IB from a current sensor (not shown). The voltage sensor and the current sensor are provided for the electrical storage device 110. In addition, the ECU 300 receives a signal that indicates a vehicle speed SPD from a speed sensor (not shown).

The ECU 300 receives an ignition signal IG for starting the vehicle, input through user's operation. In response to the received ignition signal IG, the ECU 300 closes the SMR 115 to transmit electric power from the electrical storage device 110 to the PCU 120. Instead of or in addition to the above, the ECU 300 outputs the control signal DRV to start the engine 160.

In addition, when the vehicle 100 is stopped, for example, to wait at a traffic light or when the vehicle 100 carries out an EV running mode in which only driving force from the motor generator is used to drive the vehicle 100, the ECU 300 automatically stops the engine 160 where necessary.

Note that, in FIG. 1, the single ECU 300 is provided as the control device; instead, it is also applicable that an individual control device is provided for each function or each device to be controlled, for example, a control device for the PCU 120 and a control device for the electrical storage device 110.

First Embodiment

Generally, in order to reduce vibrations during idle operation, the idle rotation speed of the engine is set at a value different from a rotation speed corresponding to the resonance frequency of the driving force transmission system to which vibrations are transmitted from the engine (resonance rotation speed).

However, for example, when the vehicle has been continuously maintained in a state where the engine is stopped for a long period of time in a low-temperature environment (for example, −15° C. or below) in a cold place, or the like, the resonance rotation speed of the driving force transmission system may vary. Therefore, when the vehicle has been continuously maintained in a state where the engine is stopped in a low-temperature environment, vibrations during idle rotation may increase because the resonance rotation speed of the driving force transmission system gets close to the idle rotation speed.

For example, in the above described vehicle, when the engine is mounted on the vehicle body, the engine is generally mounted via, for example, an elastic fixing member (mount), such as rubber, in order for vibrations generated from the driven engine not to be directly transmitted to the vehicle body.

The resonance frequency of the driving force transmission system that includes the engine varies on the basis of the elastic modulus of the mount used to mount the engine. Then, when the vehicle has been left standing in a state where the engine is stopped for a long period of time under an extremely low-temperature environment in a cold place, or the like, the mount hardens because of the characteristic of the mount, and the resonance rotation speed of the driving force transmission system may vary. As the mount hardens, that is, the elastic modulus reduces, it is generally known that the resonance frequency increases. Therefore, when the vehicle has been left standing for a long period of time in a low-temperature environment in this way, the resonance rotation speed of the driving force transmission system gets close to the idle rotation speed, so vibrations during idle operation may increase.

Then, in the first embodiment, the idle rotation speed is varied on the basis of a stop period during which the vehicle has been continuously maintained in a state where the engine is stopped in a low-temperature environment to thereby execute idle speed changing control for suppressing occurrence of resonance in the driving force transmission system during idle operation.

Figure 2:
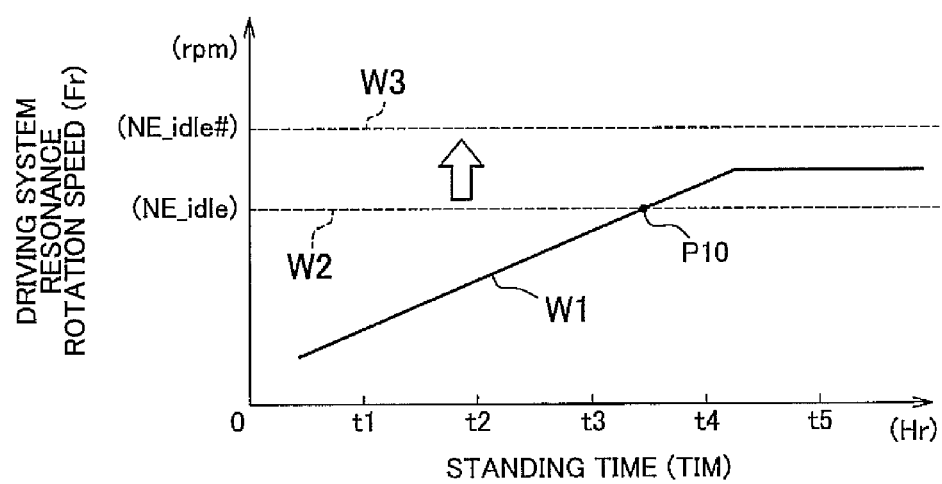
FIG. 2 is a graph for illustrating the outline of idle speed changing control according to the embodiment.

FIG. 2 is a graph for illustrating the outline of idle speed changing control in the first embodiment. The abscissa axis of FIG. 2 represents a stop period during which the vehicle has been continuously maintained in a state where the engine is stopped in a low-temperature environment (hereinafter, referred to as "standing time") TIM, the ordinate axis represents a resonance rotation speed Fr at which the driving force transmission system, including the engine, resonates.

Referring to FIG. 1 and FIG. 2, in an extremely low-temperature environment, as described above, because of hardening of the mount, the resonance rotation speed Fr of the driving force transmission system increases as shown by the solid curved line W1 in FIG. 2 as the standing time TIM extends, and saturates around a specific resonance rotation speed.

Then, in a state where the resonance rotation speed Fr has reached point P10 at which the resonance rotation speed Fr coincides with the idle rotation speed NE_idle (for example, 1300 rpm) (the broken straight line W2 in FIG. 2) of the engine 160 at roam temperature or around point P10, as the engine 160 is started and idled, the driving force transmission system may resonate because of vibrations from the engine 160, particularly, immediately after the start of the engine 160.

In the first embodiment, for example, in the mount having a characteristic shown in FIG. 2, in response to a situation that a standing time t3 (for example, 72 hours) has been reached, by which the resonance rotation speed Fr is close to the rotation speed corresponding to the idle rotation speed NE_idle, the set idle rotation speed is changed to an idle rotation speed NE_idle# (for example, 1500 rpm) which is higher than the idle rotation speed NE_idle at room temperature as indicated by the broken straight line W3 in FIG. 2. By so doing, the idle rotation speed may be set away from the resonance rotation speed of the driving force transmission system, so it is possible to prevent the resonance of the driving force transmission system.

Incidentally, in a hybrid vehicle like the vehicle 100, as described above, when the vehicle is stopped to wait at a traffic light or the EV running mode is carried out, the engine 160 may be automatically stopped. While the engine 160 is stopped, the resonance of the driving force transmission system during idle operation of the engine 160 does not occur. On the other hand, heat generated by the operation of the engine 160 and the softening of the mount due to vibrations reduce, so there is a demerit that hardening of the mount is hard to be relieved. Then, the state where the resonance of the driving force transmission system easily occurs may be continuously maintained for a long time, so the state where the idle rotation speed is set so as to be high may extend to, conversely, deteriorate fuel economy.

Then, the idle speed changing control according to the first embodiment employs a technique that, while the set idle rotation speed is set so as to be higher than that at room temperature, even when the condition that the engine 160 is allowed to automatically stop is satisfied, the operation of the engine 160 is prioritized as much as possible to quickly relieve hardening of the mount.

Figure 3:
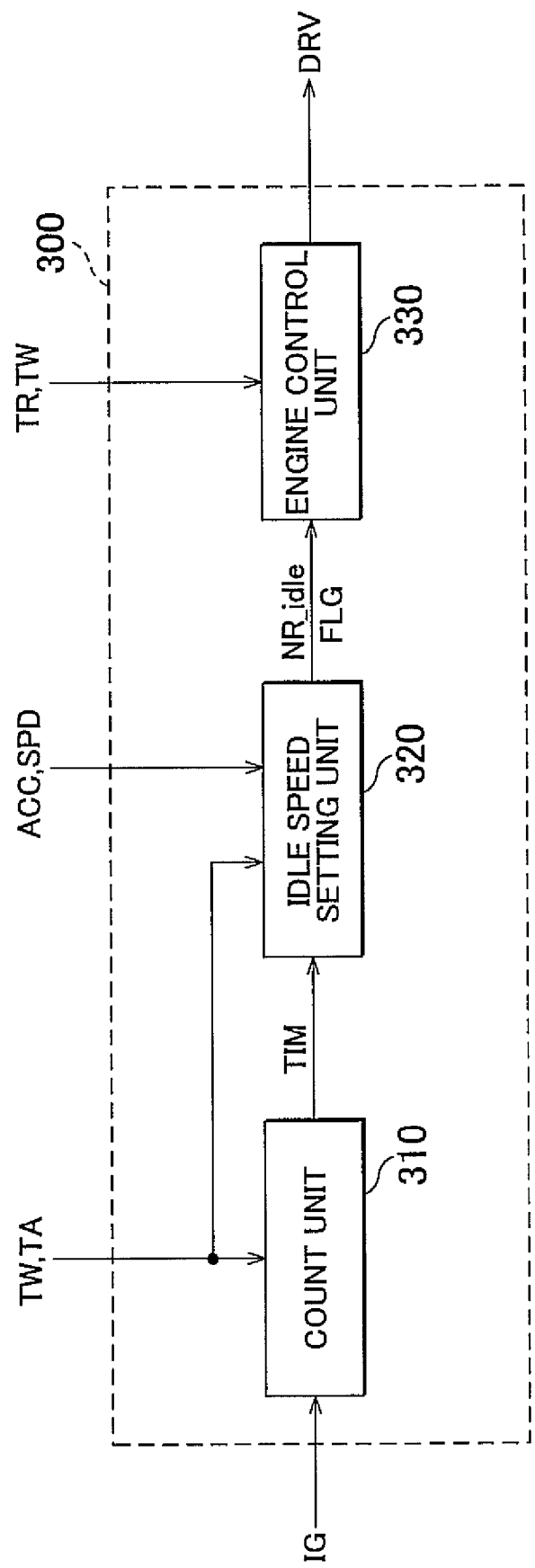
FIG. 3 is a functional block diagram for illustrating idle speed changing control executed by an ECU in the first embodiment.

FIG. 3 is a functional block diagram for illustrating idle speed changing control executed by the ECU 300 in the first embodiment. The functional blocks illustrated in the functional block diagram of FIG. 3 are implemented in the ECU 300 by hardware processing or software processing.

Referring to FIG. 1 and FIG. 3, the ECU 300 includes a count unit 310, an idle speed setting unit 320 and an engine control unit 330.

The count unit 310 receives the ignition signal IG resulting from user's operation, the coolant temperature TW from the temperature sensor 165 and the outside air temperature TA from the temperature sensor 170. The count unit 310 calculates the standing time TIM, during which the vehicle has been continuously maintained in a state where the engine is not started in a low-temperature environment, on the basis of these pieces of information. The count unit 310 outputs the calculated standing time TIM to the idle speed setting unit 320.

The idle speed setting unit 320 receives the standing time TIM from the count unit 310, the coolant temperature TW from the temperature sensor 165, the outside air temperature TA from the temperature sensor 170, the vibration acceleration ACC from the vibration sensor 180 and the vehicle speed SPD from the speed sensor (not shown). As shown in FIG. 2, the idle speed setting unit 320 sets a reference idle rotation speed NR_idle during idle operation on the basis of these pieces of information, and then outputs the set reference idle rotation speed NR_idle to the engine control unit 330.

In addition, when the idle speed setting unit 320 sets the idle rotation speed at a rotation speed NE_idle# higher than that at room temperature, the idle speed setting unit 320 sets a control flag FLG, which indicates that the idle rotation speed is changed, in an on state, and then outputs the control flag FLG to the engine control unit 330.

The engine control unit 330 receives the reference idle rotation speed NR_idle and the control flag FLG from the idle speed setting unit 320. During idle operation, the engine control unit 330 generates the control signal DRV such that the rotation speed of the engine 160 becomes the reference idle rotation speed NR_idle to thereby control the engine 160. In addition, during vehicle running, the engine control unit 330 generates the control signal DRV such that a torque TR determined from user's operation of an accelerator pedal, or the like, is output to control the engine 160.

Furthermore, the engine control unit 330 receives the coolant temperature TW from the temperature sensor 165. The engine control unit 330 automatically stops the engine 160 in response to a situation that another specific condition of the SOC, the torque TR, or the like, is satisfied as the engine 160 is warmed up and the coolant temperature TW increases to a predetermined temperature. However, when the control signal FLG from the idle speed setting unit 320 is in the on state, that is, when the idle rotation speed is set so as to be high in order to avoid the resonance rotation speed of the driving force transmission system, the engine control unit 330 does not stop the engine 160 even when the engine automatic stop condition is satisfied.

Figure 4:
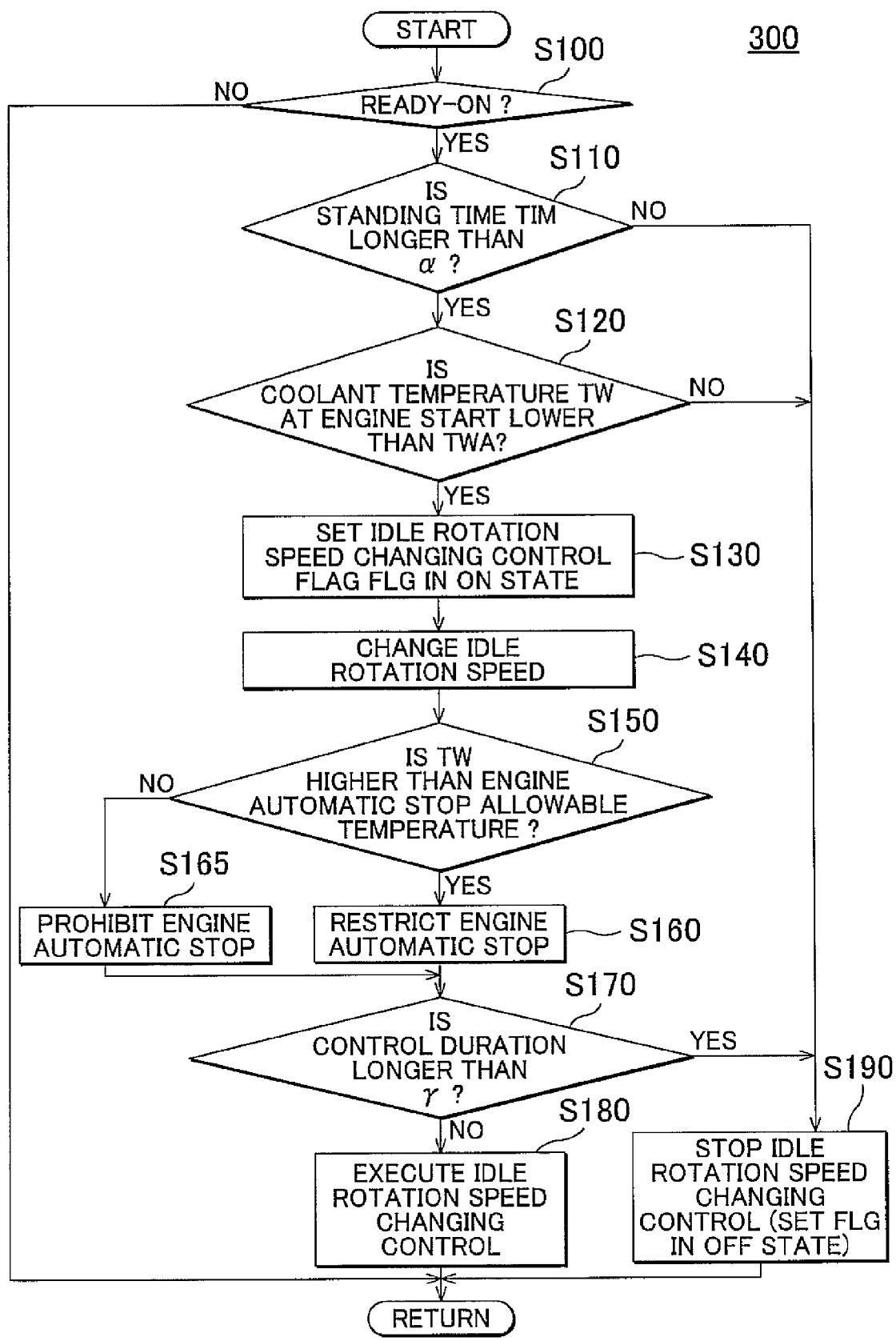
FIG. 4 is a flow chart for illustrating the details of idle speed changing control process executed by the ECU in the first embodiment.

FIG. 4 is a flow chart for illustrating the details of idle speed changing control process executed by the ECU 300 in the first embodiment. The flow charts shown in FIG. 4 and FIG. 6 (described later) are processed in the following manner. A program prestored in the ECU 300 is called from a main routine and is executed at predetermined intervals. Alternatively, part or whole of the steps may be processed by exclusive hardware (electronic circuit).

Referring to FIG. 1 and FIG. 4, the ECU 300 determines in step (hereinafter, step is abbreviated as S) 100 whether it is a ready-on state that is a drivable state in response to the ignition signal IG resulting from user's operation.

When it is not the ready-on state (NO in S100), the engine 160 is not started, so the ECU 300 ends the process.

When it is the ready-on state (YES in S100), the ECU 300 subsequently determines in S110 whether the standing time TIM in a low-temperature environment is longer than a predetermined reference value $\alpha$.

When the standing time TIM is shorter than or equal to the reference value $\alpha$ (NO in S110), the ECU 300 determines that the resonance rotation speed of the driving force transmission system has not reached around the idle rotation speed. Then, the ECU 300 causes the process to proceed to S190, and then ends the process without changing the idle rotation speed.

When the standing time TIM is longer than the reference value $\alpha$ (YES in S110), the process proceeds to S120, and then it is determined whether the coolant temperature TW at the time when the engine 160 is started is lower than a predetermined threshold TWA. This is to determine whether the vehicle is placed in a low-temperature environment at the time when the engine 160 is started. Note that, in S120, the coolant temperature TW that reflects the actual temperature of the engine 160 is used as an index that the vehicle is placed in a low-temperature environment; instead, for example, another signal, such as the outside air temperature TA from the temperature sensor 170, may be used to determine whether the vehicle is placed in a low-temperature environment.

When the coolant temperature TW is higher than or equal to a threshold TWA (NO in S120), the ECU 300 determines that, for example, the outside air temperature is high in daytime, or the like, the hardened state of the mount is highly likely to be relieved and the resonance rotation speed of the driving force transmission system has not reached around the idle rotation speed. Then, the ECU 300 causes the process to proceed to S190, and then ends the process without changing the idle rotation speed.

On the other hand, when the coolant temperature TW is lower than the threshold TWA (YES in S120), the ECU 300 determines that the vehicle is placed in a low-temperature environment and the resonance rotation speed of the driving force transmission system is highly likely to have reached around the idle rotation speed. Then, the ECU 300 sets the control flag FLG of the idle speed changing control in the on state in S130, and changes the reference idle rotation speed NR_idle to the rotation speed NE_idle# (for example, 1500 rpm) higher than the rotation speed NE_idle at room temperature (for example, 1300 rpm) in S140. Note that the changed rotation speed NE_idle# may be set at a value lower than the rotation speed NE_idle at room temperature as long as the resonance rotation speed of the driving force transmission system may be avoided and the engine 160 may be stably operated.

Subsequently, the ECU 300 determines in S150 whether the engine 160 has been warmed up to the temperature, at which the engine 160 is allowed to automatically stop, on the basis of the current coolant temperature TW.

When the coolant temperature TW is lower than or equal to the engine automatic stop allowable temperature (NO in S150), the process proceeds to S165, and then automatic stop of the engine 160 is prohibited. After that, the process proceeds to S170.

On the other hand, when the coolant temperature TW is higher than the engine automatic stop allowable temperature (YES in S150), the process proceeds to S160, and then the ECU 300 restricts automatic stop of the engine 160. After that, the process proceeds to S170.

Here, restricting automatic stop in S160 includes, in addition to prohibiting engine automatic stop, not prohibiting engine automatic stop itself but reducing the frequency of automatic stop as compared with normal times. In terms of relieving hardening of the mount, it is desirable that automatic stop of the engine is prohibited to reduce a period of time required to relieve hardening of the mount. However, for example, when the SOC of the electrical storage device 110 is high and electric power generated by the motor generator 130 cannot be sufficiently stored, there may be no other choice but to stop the engine 160. Therefore, when it is not desirable to maintain the operation of the engine 160 from another condition, the engine 160 may be stopped even when the idle rotation speed is changed.

Then, the ECU 300 determines in S170 whether a period during which control for changing the idle rotation speed is executed, that is, a control duration, is longer than a predetermined threshold $\gamma$ on the basis of the driving condition of the vehicle.

When the control duration is shorter than or equal to the threshold $\gamma$ (NO in S170), the ECU 300 determines that softening of the mount due to vibration energy and heat energy that are generated through idle operation of the engine 160 is not sufficient yet. Therefore, the process proceeds to S180, and then the ECU 300 maintains idle speed changing control to keep the idle rotation speed NE_idle# higher than that at normal temperature.

When the control duration is longer than the threshold $\gamma$ (YES in S170), the ECU 300 determines that hardening of the mount that supports the engine 160 is relieved by vibration energy and heat energy that are generated through idle operation of the engine 160. That is, the ECU 300 determines that the resonance rotation speed of the driving force transmission system is decreased and is set away from the idle rotation speed NE_idle at room temperature. Then, the process proceeds to S190, and then the ECU 300 stops idle speed changing control to return the idle rotation speed to the idle rotation speed NE_idle at room temperature and sets the control flag FLG in an off state.

Note that, in FIG. 4, idle speed changing control is executed when the coolant temperature TW at the engine start is lower than the threshold TWA (S120); however, the process of step S120 is optional, and idle speed changing control may be executed when the standing time TIM is longer than the reference value $\alpha$ irrespective of the coolant temperature TW at the engine start.

By executing control in accordance with the above described processes, it is possible to prevent a situation that the mount that supports the engine hardens because the vehicle has been maintained in a low-temperature environment for a long period of time and, as a result, the resonance rotation speed of the driving force transmission system increases to thereby cause resonance during idle operation. In addition, because the idle rotation speed is changed by predicting occurrence of vibrations, it is possible to reduce chances of occurrence of vibrations due to resonance. Furthermore, while the idle rotation speed is changed, engine automatic stop is restricted, so a period of time required to relieve hardening of the mount is reduced to thereby make it possible to early return the idle rotation speed to the idle rotation speed at room temperature.

Second Embodiment

Control in the first embodiment is applicable to any vehicle on which an engine is mounted.

In addition, in the hybrid vehicle shown in FIG. 1, control may be executed such that an engine command power and a target torque of the motor generator are determined on the basis of a driver request torque.

Then, in a second embodiment, the configuration that an engine command power is changed in accordance with a variation in idle rotation speed such that the efficiency of the engine is optimal in the case where the idle speed changing control described in the first embodiment is applied to the hybrid vehicle shown in FIG. 1 will be described.

Figure 5:
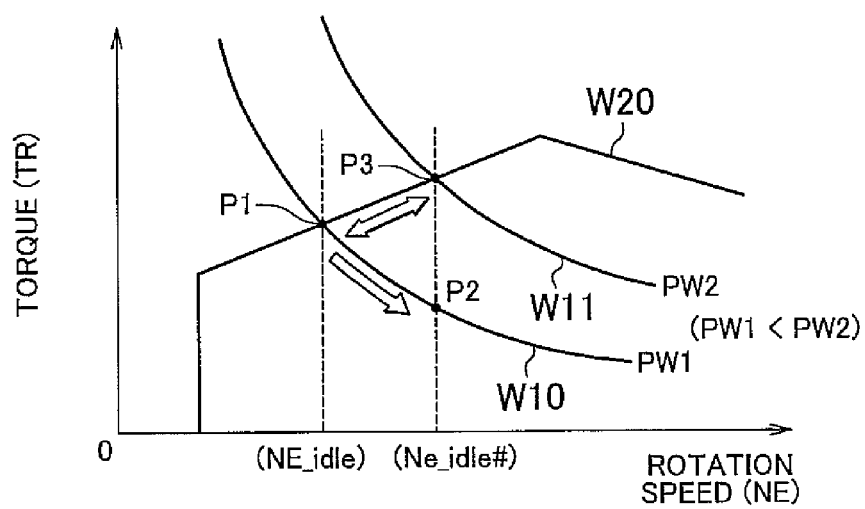
FIG. 5 is a graph for illustrating the outline of a technique for setting the rotation speed and torque of the engine in the case where idle speed changing control is applied to a hybrid vehicle in a second embodiment.

FIG. 5 is a graph for illustrating the outline of a technique for setting the rotation speed and torque of the engine when the idle speed changing control is applied to the hybrid vehicle in the second embodiment. In FIG. 5, the abscissa axis represents an engine rotation speed NE, and the ordinate axis represents a torque TR to the engine.

Referring to FIG. 1 and FIG. 5, the curved line W20 in FIG. 5 is an operation line that indicates the correlation between a rotation speed NE and a torque TR, at which the efficiency is optimal, from the characteristic of the engine 160.

If the idle rotation speed at room temperature is the rotation speed NE_idle, the torque TR is set so as to become an operation point indicated by point P1 from the above described operation line W20. The correlation between the rotation speed NE and the torque TR for achieving the request power PW1 is indicated by the curved line W10 in FIG. 5.

At this time, when only the engine rotation speed NE is simply varied to the rotation speed NE_idle# through idle speed changing control described in the first embodiment, the torque TR varies along the curved line W10 when allocation of request power to the engine 160 is the same, and the engine 160 is driven at an operation point indicated by point P2.

The operation point at point P2 is not on the operation line W20 in the case of the optimal efficiency, so the efficiency of the engine 160 decreases.

Therefore, in idle speed changing control according to the second embodiment, when the idle rotation speed is varied in the hybrid vehicle shown in FIG. 1, allocation of request power to the engine 160 is changed such that the changed operation point is placed on the operation line W20. For example, in the example of FIG. 5, the request power for the engine 160 is changed from PW1 to PW2 such that the engine 160 is driven at point P3 at which the rotation speed becomes the NE_idle# on the operation line W20.

In addition, even when idle speed changing control is stopped to return the idle rotation speed to the idle rotation speed at room temperature, that is, from point P3 to point P1 in FIG. 5, the rotation speed NE and torque TR of the engine are set along the operation line W20.

FIG. 6 is a flow chart for illustrating the details of idle speed changing control process executed by the ECU 300 in the second embodiment. FIG. 6 differs from FIG. 4 in the first embodiment in that step S140 in the above described flow chart is replaced with S140A. In FIG. 6, the description of steps that overlap with the steps of FIG. 4 is not repeated.

Referring to FIG. 6, when the ECU 300 determines that the standing time TIM is longer than the predetermined reference value α (YES in S110) and the coolant temperature TW at the engine start is lower than the threshold TWA (YES in S120), the ECU 300 causes the process to proceed to S130, and then sets the idle rotation speed changing control flag FLG in the on state.

Then, the process proceeds to S140A, and then the ECU 300 sets the idle rotation speed using the map shown in FIG. 2. In addition, the ECU 300 uses the map shown in FIG. 5 to determine a request power, at which the efficiency of the engine 160 is optimal, at the set changed idle rotation speed, and sets the allocation of driving force among the engine 160 and the motor generators 130 and 135.

After that, the ECU 300 determines in S150 whether it is the coolant temperature at which engine automatic stop is allowed, and then prohibits engine automatic stop (S165) or restricts engine automatic stop (S160) on the basis of the determined result.

Then, in S170, the ECU 300 carries out idle operation using the idle rotation speed and the request power to the engine 160, which are set in S140A, until the duration of the idle rotation speed changing control reaches the predetermined threshold γ.

Note that, as described above, when idle speed changing control is stopped (S190), the idle rotation speed is changed and a request power is selected such that the efficiency of the engine is optimal.

Control is executed in accordance with the above described processes, and the request power is changed such that the engine is driven with optimal efficiency in accordance with a change of the idle rotation speed in the hybrid vehicle. Thus, it is possible to suppress a decrease in the efficiency of the vehicle as a whole while preventing resonance in a low-temperature environment.

Note that, in the above description, the resonance rotation speed of the driving force transmission system varies with hardening of the mount; however, it is not limited to factors of the mount. When the resonance rotation speed of the driving force transmission system varies in the case where the vehicle is subjected to a low-temperature environment, the aspect of the invention may be applied.

In addition, restricting engine automatic stop includes changing the threshold of a parameter, at which engine automatic stop is allowed, such that it is hard to be achieved as compared with that during normal times. For example, for the coolant temperature, setting the engine automatic stop allowable temperature so as to be higher than that during normal times is included.

The embodiments described above should be regarded as only illustrative in every respect and not restrictive. The scope of the invention is defined by the appended claims rather than the above description. The scope of the invention is intended to encompass all modifications within the scope of the appended claims and equivalents thereof.

What is claimed is:

1. A control device for an internal combustion engine that automatically stops, comprising:
    an idle speed setting unit that sets a first idle rotation speed that is used after a lapse of a short stop period of the internal combustion engine, and a second idle rotation speed that is used after a lapse of a long stop period of the internal combustion engine, at different values; and
    an internal combustion engine control unit that, when an idle rotation speed of the internal combustion engine is the second idle rotation speed, restricts automatic stop of the internal combustion engine.

2. The control device according to claim 1, wherein
    the idle speed setting unit is configured to set the idle rotation speed at the first idle rotation speed when a stop period of the internal combustion engine is shorter than or equal to a predetermined reference value, and is configured to set the idle rotation speed at the second idle rotation speed when the stop period is longer than the predetermined reference value.

3. The control device according to claim 2, wherein the idle speed setting unit is configured to set the second idle rotation speed so as to be higher than the first idle rotation speed.

4. The control device according to claim 3, wherein when a value relevant to an ambient temperature at the time of starting the internal combustion engine is lower than a threshold and the stop period is longer than the reference value, the idle speed setting unit is configured to set the idle rotation speed at the second idle rotation speed.

5. The control device according to claim 2, wherein the idle speed setting unit is configured to set the second idle rotation speed so as to be higher than a maximum value of a resonance rotation speed corresponding to a resonance frequency of a driving force transmission system that includes the internal combustion engine.

6. The control device according to claim 1, wherein, when the idle rotation speed is the second idle rotation speed, the internal combustion engine control unit is configured to prohibit automatic stop of the internal combustion engine.

7. The control device according to claim 1, wherein a condition for carrying out automatic stop of the internal combustion engine includes a situation that a temperature of coolant of the internal combustion engine is higher than a predetermined threshold, and, even when the temperature of coolant of the internal combustion engine is higher than the predetermined threshold, the internal combustion engine control unit is configured to restrict automatic stop of the internal combustion engine when the idle rotation speed is the second idle rotation speed.

8. The control device according to claim 1, wherein the internal combustion engine is mounted on a vehicle through a fixing member, and the fixing member is configured such that a resonance frequency of a driving force transmission system that includes the internal combustion engine increases as a temperature of the fixing member decreases.

9. The control device according to claim 1, wherein the internal combustion engine is configured to be used together with a driving electric motor, and the internal combustion engine control unit is configured to control the internal combustion engine and the driving electric motor such that required driving force is generated from the internal combustion engine and the driving electric motor, and is configured to, when the idle rotation speed is set at the second idle rotation speed, set an output of the internal combustion engine at an output that is different from an output of the internal combustion engine when the idle rotation speed is set at the first idle rotation speed.

10. The control device according to claim 9, wherein the internal combustion engine control unit is configured to control the internal combustion engine and the driving electric motor such that the required driving force is generated from the internal combustion engine and the driving electric motor, and is configured to, when the idle rotation speed is set at the second idle rotation speed, set the output of the internal combustion engine at an output that is different from the output of the internal combustion engine when the idle rotation speed is set at the first idle rotation speed and that efficiency of the internal combustion engine is optimal.

11. A vehicle comprising:
an internal combustion engine that automatically stops; and
a control device that is used to control the internal combustion engine, wherein
the control device is configured to set a first idle rotation speed that is used after a lapse of a short stop period of the internal combustion engine, and a second idle rotation speed that is used after a lapse of a long stop period of the internal combustion engine, at different values, and is configured to, when an idle rotation speed of the internal combustion engine is the second idle rotation speed, restrict automatic stop of the internal combustion engine.

12. The vehicle according to claim 11, wherein the internal combustion engine is mounted on the vehicle through a fixing member, and
the fixing member is configured such that a resonance frequency of a driving force transmission system that includes the internal combustion engine increases as a temperature of the fixing member decreases.

13. A control method for an internal combustion engine that automatically stops, comprising:
setting a first idle rotation speed that is used after a lapse of a short stop period of the internal combustion engine, and a second idle rotation speed that is used after a lapse of a long stop period of the internal combustion engine, at different values; and
restricting automatic stop of the internal combustion engine, when an idle rotation speed of the internal combustion engine is the second idle rotation speed.

* * * * *